(12) United States Patent
Wendt et al.

(10) Patent No.: US 10,420,191 B2
(45) Date of Patent: Sep. 17, 2019

(54) CONTROL SYSTEM FOR CONTROLLING A LIGHTING SYSTEM

(71) Applicant: SIGNIFY HOLDING B.V., Eindhoven (NL)

(72) Inventors: Matthias Wendt, Würselen (DE); Manuel Eduardo Alarcon-Rivero, Delft (NL); Maurice Herman Johan Draaijer, Ittervoort (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 6 days.

(21) Appl. No.: 15/523,052

(22) PCT Filed: Oct. 23, 2015

(86) PCT No.: PCT/EP2015/074656
§ 371 (c)(1),
(2) Date: Apr. 28, 2017

(87) PCT Pub. No.: WO2016/066556
PCT Pub. Date: May 6, 2016

(65) Prior Publication Data
US 2017/0325318 A1 Nov. 9, 2017

(30) Foreign Application Priority Data
Oct. 28, 2014 (EP) .................................... 14190661

(51) Int. Cl.
*H05B 37/02* (2006.01)

(52) U.S. Cl.
CPC ..... *H05B 37/0227* (2013.01); *H05B 37/0245* (2013.01)

(58) Field of Classification Search
CPC ....................... H05B 37/0227; H05B 37/0245; H05B 37/02; H05B 33/0833; H05B 33/0845
See application file for complete search history.

(56) References Cited

U.S. PATENT DOCUMENTS

| 6,528,957 B1 | 3/2003 | Luchaco |
| 7,566,987 B2 | 7/2009 | Black et al. |

(Continued)

FOREIGN PATENT DOCUMENTS

| DE | 102012222652 A1 | 6/2014 |
| EP | 2642828 A1 | 9/2013 |

(Continued)

*Primary Examiner* — Wei (Victor) Chan
*Assistant Examiner* — Henry Luong
(74) *Attorney, Agent, or Firm* — Meenakshy Chakravorty

(57) ABSTRACT

The invention relates to a control system (4) for controlling lighting units (30, 31, 32, 33) of a lighting system (1), wherein the lighting units are assigned to different areas and the control system is adapted to control the lighting units in accordance with a lighting command, which defines desired power levels, and depending on occupancy information, which is indicative of a degree of occupancy of the areas, such that different lighting units are set to their desired power levels at different times, even if the provided lighting command requests to set the lighting units to their respective desired power levels at substantially the same time. This can reduce the likelihood of, for instance, blown fuses or damaged components of the lighting system, while, because of the consideration of the occupancy information, the delay in setting the lighting units to their desired power levels may be not or only hardly visible.

12 Claims, 9 Drawing Sheets

(56) References Cited

U.S. PATENT DOCUMENTS

| | | |
|---|---|---|
| 2006/0190139 A1 | 8/2006 | Reaume et al. |
| 2011/0140612 A1 | 6/2011 | Mohan et al. |
| 2012/0011038 A1 | 1/2012 | Schnack et al. |
| 2012/0028981 A1 | 2/2012 | Miller |
| 2012/0086363 A1 | 4/2012 | Golding et al. |
| 2012/0235579 A1* | 9/2012 | Chemel .................. F21S 2/005 315/152 |
| 2012/0299485 A1* | 11/2012 | Mohan ................ H05B 37/0218 315/153 |
| 2014/0172133 A1* | 6/2014 | Snyder ................ H04L 12/2818 700/90 |
| 2015/0102734 A1* | 4/2015 | Asami ................ H05B 37/0272 315/154 |

FOREIGN PATENT DOCUMENTS

| | | |
|---|---|---|
| WO | 2010100586 A2 | 9/2010 |
| WO | 2011039688 A1 | 4/2011 |
| WO | 2014018234 A1 | 1/2014 |
| WO | 2014108815 A2 | 7/2014 |

* cited by examiner

| LA | LL | RN | OD | OS |
|---|---|---|---|---|
| 192.168.044.001 | F1 | 20 | Y | 2 |
| 192.168.044.002 | F2 | 540 | N | 10 |
| 192.168.044.003 | F1 | 27 | Y | 4 |
| 192.168.044.004 | F2 | 680 | N | 11 |
| 192.168.044.005 | F1 | 50 | Y | 5 |
| 192.168.044.006 | F3 | 120 | N | 6 |
| 192.168.044.007 | F1 | 3 | Y | 1 |
| 192.168.044.008 | F2 | 321 | N | 9 |
| 192.168.044.009 | F1 | 25 | Y | 3 |
| 192.168.044.010 | F2 | 156 | N | 7 |
| 192.168.044.011 | F3 | 724 | N | 12 |
| 192.168.044.012 | F3 | 192 | N | 8 |

CONTROL SYSTEM FOR CONTROLLING A LIGHTING SYSTEM

CROSS-REFERENCE TO PRIOR APPLICATIONS

This application is the U.S. National Phase application under 35 U.S.C. § 371 of International Application No. PCT/EP2015/074656, filed on Oct. 23, 2015, which claims the benefit of European Patent Application No. 14190661.0, filed on Oct. 28, 2014. These applications are hereby incorporated by reference herein.

FIELD OF THE INVENTION

The invention relates to a control system, method and computer program for controlling lighting units of a lighting system. The invention relates also to a lighting system comprising the control system.

BACKGROUND OF THE INVENTION

WO 2014/018234 A1 discloses a lighting control subsystem comprising a luminaire, a controller coupled to the luminaire and a sensor coupled to the controller, wherein the sensor generates a sensed input. The lighting control subsystem further comprises a communication interface coupling the controller to an external device, wherein the controller is operative to control a light output of the luminaire based at least in part on the sensed input and to communicate at least one of state or sensed information to the external device.

US 2011/0140612 A1 discloses a method for controlling light, wherein a light adjusting trigger event is detected, a random delay time is selected, and the light is adjusted after detecting the light adjusting trigger event and after the random delay time.

WO 2014/108815 A2 discloses a lighting control analyzer for determining occupancy behavior in an area arranged to be at least partly illuminated by at least one lighting unit controllable by a lighting controller. The lighting control analyzer is adapted to receive light settings for control of the at least one lighting unit, wherein the light settings are determined by the lighting controller using a lighting control strategy for the area and wherein the lighting control strategy represents a desired illumination of at least a part of the area based on presence information associated with at least one location in the area. The lighting control analyzer is further adapted to determine the occupancy behavior based on the light settings and the lighting control strategy.

Known control systems for controlling a lighting system of a building generally control lighting units such that they are substantially simultaneously switched on, for instance, before work starts in an office in the morning. This can cause relatively large inrush currents, which may, for example, lead to blown fuses or damaged components of the lighting system.

SUMMARY OF THE INVENTION

It is an object of the present invention to provide a controlling system, method and computer program for controlling lighting units of a lighting system, which allow for a reduced likelihood of blown fuses or damaged components of the lighting system, especially if several lighting units should be switched on at substantially the same time.

In a first aspect of the present invention a control system for controlling lighting units of a lighting system is presented, wherein the lighting units are assigned to different areas and the control system comprises:
 a lighting command providing unit for providing a lighting command defining desired power levels of lighting units of the lighting system,
 an occupancy information providing unit for providing occupancy information being indicative of a degree of occupancy of the areas,
 a control unit for controlling the lighting units, wherein the control unit is adapted to control the lighting units in accordance with the lighting command and depending on the occupancy information such that different lighting units are set to their desired power levels, which are defined by the provided lighting command, at different times.

Since the control unit is adapted to control the lighting units such that different lighting units are set to their desired power levels at different times, even if the provided lighting command requests to set the lighting units to their respective desired power levels at substantially the same time, the likelihood of, for instance, blown fuses or damaged components of the lighting system can be reduced. Moreover, since this control is carried out depending on the occupancy information, the times, at which the lighting units are set to their desired power levels, can be determined depending on, for instance, whether a respective area is occupied by a person or not. For example, if the degree of occupancy is binary, i.e. the occupancy information indicates whether a person is within an area or not, the control unit can control the lighting units such that the lighting units assigned to an occupied area are firstly set to their power levels and then the lighting units assigned to non-occupied areas are set to their power levels. This can lead to the effect that the delay in setting the lighting units to their desired power levels is less visible.

The control unit can be adapted to control the lighting units in accordance with the lighting command and depending on the occupancy information such that all lighting units, for which the provided lighting command defines desired power levels, are set to their desired power levels at different times or such that some of these lighting units, for which the provided lighting command defines desired power levels, are set to their desired power levels at different times. Thus, the control unit can be adapted to control the lighting units in accordance with the lighting command and depending on the occupancy information such that at least two lighting units, for which the provided lighting command defines desired power levels, are set to their desired power levels at different times. In particular, which lighting units should be set to which desired power levels is defined by the lighting command, wherein the occupancy information is used for defining at which times the lighting units should be set to the desired power levels, wherein for at least two, especially all, lighting units, for which the lighting command defines desired power levels, the times, at which the lighting units are set to their desired power levels, are different.

Preferentially, the several lighting units are assigned to different areas of a building and the occupancy information providing unit is adapted to provide occupancy information being indicative of a degree of occupancy of these areas of the building. The different areas might be different rooms, floors, corridors, et cetera of a building. The different areas might also be different spaces in warehouses or different parking lots. Moreover, the areas may also be areas outside a building, wherein the occupancy information providing unit may provide occupancy information being indicative of the presence of, for instance, vehicles or pedestrians in these outside areas.

The degree of occupancy can be a binary degree of occupancy as described above or there can be more than two different levels of occupancy. The occupancy information providing unit can be a receiving unit being adapted to receive the occupancy information from occupancy sensors sensing the different areas. However, the occupancy information providing unit can also comprise the occupancy sensors sensing the different areas. The occupancy sensors can be integrated in at least some of the lighting units of the lighting system or they can be separate units. The occupancy sensors, which can also be regarded as being presence sensors, can be adapted to, for instance, detect motion and/or sound and/or heat or other parameters, in order to determine the degree of occupancy. Moreover, the lighting command providing unit can be a receiving unit for receiving the lighting command from a further control system like a control system controlling an entire building. However, the lighting command providing unit can also be this further control system. This further control system can request, for instance, switching on several lighting units at substantially the same time. The lighting command providing unit can be adapted to provide lighting commands defining desired power levels of several lighting units and/or lighting commands defining desired power levels of single lighting units. For example, in an embodiment a lighting command can be provided by the lighting command providing unit, which indicates that several or all of the lighting units of the lighting system should be switched on.

The control unit can be adapted to randomly control at which times the respective lighting units are set to their respective desired power levels, wherein the random control depends on the occupancy information. In particular, the control unit can be adapted to randomly control the lighting units such that a lighting unit assigned to an area having a higher degree of occupancy is set to its desired power level before setting a desired power level of a lighting unit assigned to an area having a smaller degree of occupancy. The control unit can be adapted to assign probabilities to the lighting units depending on the occupancy information, wherein the probability is the probability of earliness of setting the respective desired power level during the random control and wherein the control unit can be adapted to randomly distribute the power level setting times, at which the respective lighting units are to be set to their respective power levels, depending on the assigned probabilities. Preferentially, the control unit is adapted to assign a higher probability to a lighting unit assigned to an area having a larger degree of occupancy and to assign a lower probability to a lighting unit assigned to an area having a smaller degree of occupancy. Thus, the lighting units may not be set to the desired power levels in a regular order, which might be defined by, for instance, their locations or addresses, but in a random manner. This can lead to the effect that all occupied areas are at least slightly illuminated at relatively short notice. Moreover, since the random control considers the occupancy information, the visibility of the delayed setting of the lighting units to their desired power levels can be reduced.

The control unit is preferentially adapted to randomly distribute power level setting times, at which the respective lighting units are to be set to their respective power levels, over a predefined time interval and to control the lighting units in accordance with the randomly distributed power level setting times. The predefined time interval can be regarded as being a maximum random delay time. The predefined time interval is preferentially modifiable, in order to allow for a modification of the degree of smoothing of the overall power consumption change when setting the lighting units to their desired power levels.

In a preferred embodiment the control unit is adapted to determine the overall power change, which will be caused when the desired power levels as defined by the lighting command are set, to compare the determined overall power change with a predefined power change threshold and to control the power levels of the lighting units in accordance with the lighting command and depending on the occupancy information such different lighting units are set to their desired power levels at different times, only if the determined overall power change is larger than the predefined power change threshold. Thus, firstly it may be determined whether the provided lighting command can lead to an overall power change amount, which is so large that the overall power change amount may cause problems like blown fuses or damages to components of the lighting system, wherein, only if this is the case, the control unit may control the lighting units in accordance with the lighting command and depending on the occupancy information such that different lighting units are set to their desired power levels at different times. The delays in setting the lighting units to their power levels, which leads to a slower setting of the lighting units to their desired power levels, may therefore only be used, if really necessary, thereby further improving the performance of the control system.

The control unit may comprise rules defining the number of lighting units which are allowed to be switched on at the same time and defining a waiting time before switching one or several further lighting units and to control the lighting units depending on these rules. These rules may be modifiable and set, for instance, by an installer installing the lighting system.

In a preferred embodiment the control unit is adapted to calculate the overall power change, which will be caused when the desired power levels as defined by the lighting command are set, and to set the different lighting units to their desired power levels at different times such that a slope of the overall power change will be larger, if the calculated overall power change is smaller, and that a slope of the overall power change will be smaller, if the calculated overall power change is larger. In particular, the control unit can be adapted to control the lighting units such that different lighting units are set to their desired power levels at different power level setting times distributed over a smaller time interval, if the calculated overall power change amount is smaller, and over a larger time interval, if the determined overall power change amount is larger. Thus, the reduction of the slope can be adapted to the respective expected overall power change amount. This can lead to the effect that the reduced slope of the overall power consumption is not smaller than required for significantly reducing the likelihood of, for instance, blown fuses or damaged components of the lighting system. In other words, the lighting units may reach their desired power levels still very fast, wherein the likelihood of, for instance, blown fuses or damaged components of the lighting system is still reduced.

In a further preferred embodiment the lighting units are grouped, wherein the control unit is adapted to control the lighting units per group. For instance, lighting units illuminating a same room or a same floor of a building may be controlled as a group, wherein different groups may be controlled differently, i.e. wherein the lighting units of different groups may be set to their desired power levels at different times. Especially lighting units, which can be simultaneously seen by a person, may be grouped such that these lighting units are set to their desired power level at substantially the same time, in order to prevent a blinking effect.

In an embodiment the control unit is adapted to control the lighting units such that they are set to a predefined first power level before being controlled in accordance with the lighting command and depending on the occupancy information such different lighting units are set to their desired power levels at different times. For instance, the predefined first power level can be a dim level and the control towards the desired power levels can start at this dim level. This can lead to a more homogeneous appearance of the setting of the lighting units to their desired power levels, although they are set to their desired power levels at different times.

The control system is preferentially a PoE control system for controlling a PoE lighting system. The PoE control system and the PoE lighting system are preferentially in accordance with the IEEE 802.af or IEEE 802.3at standard.

In a further aspect of the present invention a lighting system is presented, wherein the lighting system comprises several lighting units assigned to different areas and a control system for controlling the lighting units as defined in claim 1.

In another aspect of the present invention a control method for controlling lighting units of a lighting system is presented, wherein the lighting units are assigned to different areas and the control system comprises:
providing a lighting command defining desired power levels of lighting units of the lighting system by a lighting command providing unit,
providing occupancy information being indicative of a degree of occupancy of the areas by an occupancy information providing unit, and
controlling the lighting units by a control unit in accordance with the lighting command and depending on the occupancy information such that different lighting units are set to their desired power levels, which are defined by the provided lighting command, at different times.

In a further aspect of the present invention a computer program for controlling lighting units of a lighting system is presented, wherein the lighting units are assigned to different areas and the computer program comprises program code means for causing the control system as defined in claim 1 to carry out the steps of the control method as defined in claim 14, when the computer program is run on the control system.

It shall be understood that the control system of claim 1, the lighting system of claim 13, the control method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
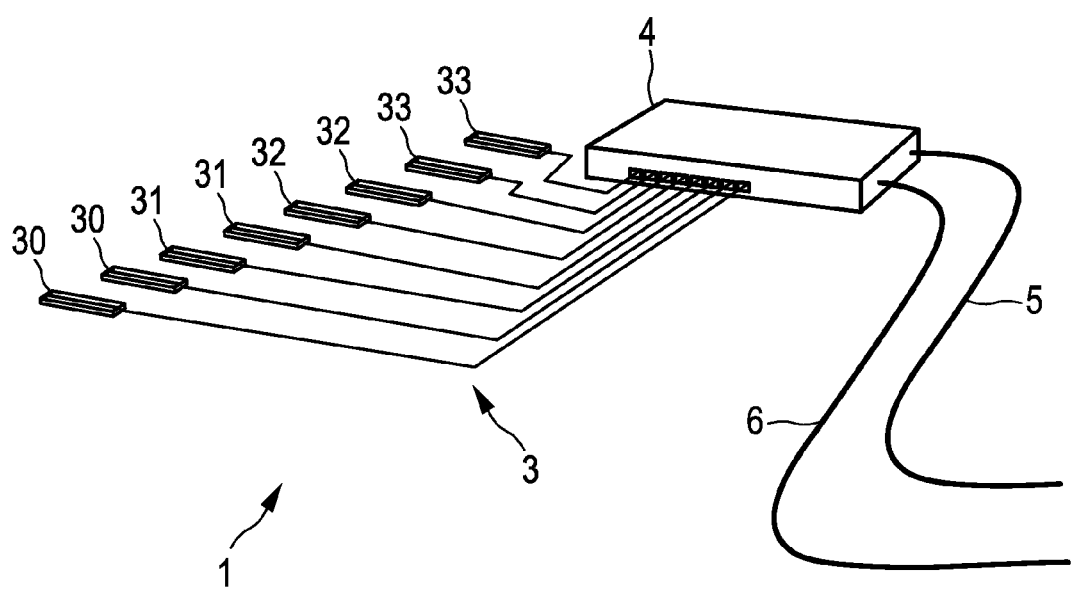
FIG. 1 shows schematically and exemplarily an embodiment of a lighting system comprising several lighting units assigned to different areas.

FIG. 1 shows schematically and exemplarily an embodiment of a lighting system 1 comprising several lighting units 30, 31, 32, 33 connected to a control system 4 via Ethernet cables 3. In this embodiment the control system 4 is PoE power sourcing equipment (PSE). The PoE PSE receives a PoE lighting command for controlling the lighting units 30, 31, 32, 33 via an Ethernet cable 5 and power via a power cable 6. Also the power cable 6 can be an Ethernet cable. However, the power cable 6 can also be another kind of cable for supplying power to the PoE PSE 4. The power can be supplied to the PoE PSE 4 via the cable 6 by, for instance, a mains power source or another PoE PSE. The PoE lighting command can be provided to the PoE PSE 4 via the Ethernet cable 5 by a further control system like a building management system which may request the lighting units 30, 31, 32, 33 to be switched on at certain times, for instance, in the morning when people arrive at an office, if the lighting units are installed in an office.

The lighting units 30, 31, 32, 33 are assigned to different areas. In this embodiment the lighting units 30, 31, 32, 33 are assigned to different areas within a building, for instance, as schematically and exemplarily illustrated in FIG. 2.

Figure 2:
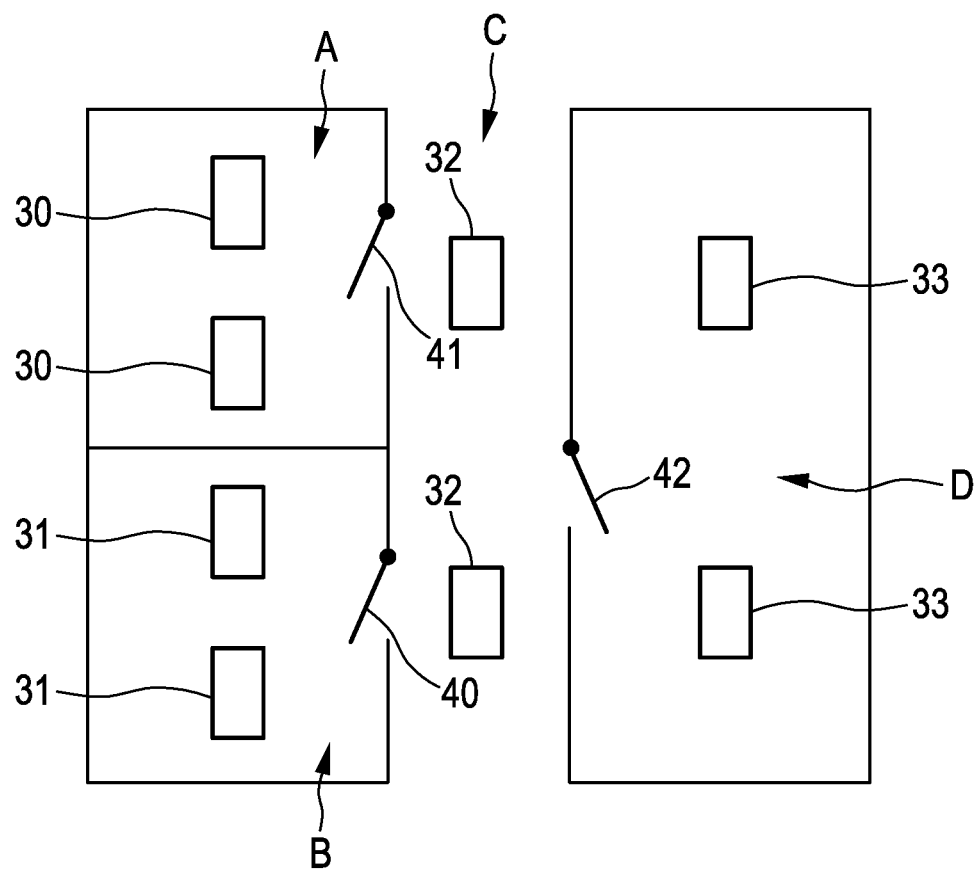
FIG. 2 illustrates schematically and exemplarily a possible assignment of the lighting units to the different areas.

As can be seen in FIG. 2, first lighting units 30 may be assigned to a first room A, second lighting units 31 may be assigned to a second room B, third lighting units 32 may be assigned to a corridor C and fourth lighting units 33 may be assigned to a third room D. In FIG. 2 reference numbers 40, 41, 42 indicate doors to the different rooms A, B, D.

Figure 3:
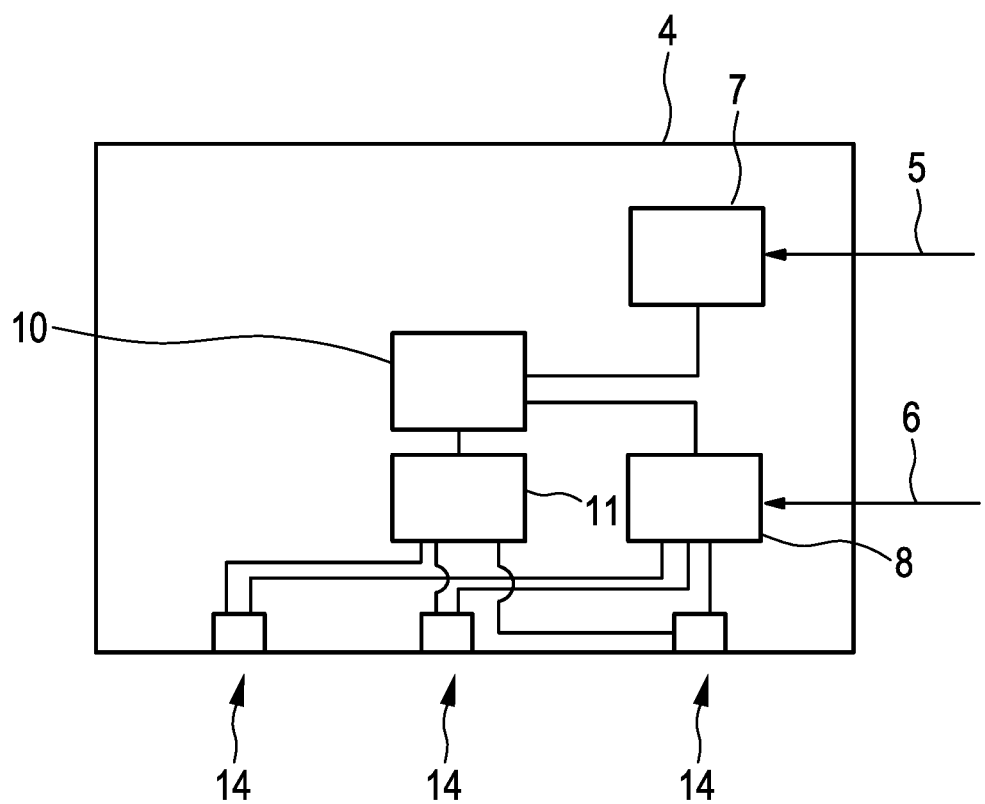
FIG. 3 shows schematically and exemplarily an embodiment of a control system for controlling the lighting system.

The PoE PSE 4 is schematically and exemplarily shown in more detail in FIG. 3. The control system 4 comprises a PoE communication unit 7 for receiving a PoE lighting command defining desired power levels of the lighting units 30, 31, 32, 33 via the Ethernet cable 5 and for providing the received PoE lighting command to a PoE control unit 10. Since the PoE communication unit 7 provides the PoE lighting command to the PoE control unit 10, it is regarded as being a lighting command providing unit. The PoE control unit 10 is adapted to determine, i.e. estimate, the overall power change amount, which will be caused by the provided PoE lighting command, based on the provided PoE lighting command. The PoE lighting command defines desired power levels of the lighting units 30, 31, 32, 33, wherein based on the defined desired power levels of the lighting units 30, 31, 32, 33 and the current power levels of the lighting units 30, 31, 32, 33 the PoE control unit 10 can determine the overall power change amount, which will be caused if the provided PoE lighting command is executed. In an example all lighting units 30, 31, 32, 33 are switched off and the provided PoE lighting command indicate that all lighting units 30, 31, 32, 33 should be switched on, wherein in this case the PoE control unit 10 determines the overall power change amount by aggregating the power required by each lighting unit 30, 31, 32, 33 in its respective switched-on state.

The PoE control unit 10 is adapted to control the lighting units 30, 31, 32, 33 such that the slope of the overall power consumption of the lighting units 30, 31, 32, 33, when being set to the desired power levels, for instance, when being switched on, is reduced, if the determined overall power change amount is larger than a predefined power change threshold. In this embodiment the PoE control unit 10 is adapted to receive the PoE lighting command, to modify the PoE lighting command, if the determined overall power change amount is larger than the predefined power change threshold, wherein the PoE lighting command can be modified such that several modified PoE lighting commands to be sent to the different lighting units are generated, and to send the one or several modified PoE lighting commands to the lighting units 30, 31, 32, 33 via a PoE communication unit 11, PoE connectors 14 and the Ethernet cables 3, wherein the PoE lighting command is modified such that the slope of the overall power consumption of the lighting units 30, 31, 32, 33, when being set to the desired power levels, is reduced. Moreover, in this embodiment the PoE control unit 10 uses slope reduction rules defining the modification of the PoE lighting command.

Thus, the wattage change potentially caused by a certain PoE lighting command may be analyzed and this analysis may be used to enable the smoothing method. This can reduce interventions in the control flow to situations in which there is really an impact which needs to be considered.

The control system 4 further comprises a power distributor 8 for distributing the power received via the power cable 6 among the Ethernet connectors 14. In particular, the PoE control unit 10 negotiates the power to be supplied to the respective lighting unit 30, 31, 32, 33 via the PoE communication unit 11 with the respective lighting unit 30, 31, 32, 33, after the respective lighting unit 30, 31, 32, 33 has received the respective modified PoE lighting command, and to control the power distributor 8 to distribute the power in accordance with the result of the negotiation. It should be noted that FIG. 3 only shows three Ethernet connectors 14 for clarity reasons. The control system 4 can of course comprise more Ethernet connectors 14, for instance, eight Ethernet connectors as schematically and exemplarily illustrated in FIG. 1.

A PoE lighting command defines a certain action to be carried out by the respective lighting unit 30, 31, 32, 33 like switching on, changing a dim level and/or the color of the light provided by the respective lighting unit 30, 31, 32, 33, changing the direction of the light, et cetera. The PoE control unit 10 may comprise a table or the like for determining the respective power level associated with the respective action defined by the respective PoE lighting command, in order to allow the PoE control unit to determine the overall power change.

The PoE communication unit 11 is adapted to receive occupancy information from the lighting units 30, 31, 32, 33 and to provide the received occupancy information to the PoE control unit 10. The PoE communication unit 11 can therefore be regarded as being an occupancy information providing unit. The occupancy information is indicative of the degree of occupancy of the respective area A, B, C, D, i.e. of the different rooms A, B, D and the corridor C in this embodiment. In this embodiment the occupancy information is binary information, i.e. it indicates in which areas persons are present and in which areas persons are not present.

In this embodiment the PoE control unit 10 is adapted to control the power levels of the lighting units 30, 31, 32, 33 in accordance with the PoE lighting command and depending on the occupancy information such that different lighting units 30, 31, 32, 33 are set to their desired power levels at different times. In particular, the PoE control unit 10 is adapted to randomly control at which times the respective lighting units 30, 31, 32, 33 are set to their respective desired power levels, wherein the corresponding power level setting times are randomly distributed within a predefined time interval which is defined by the slope reduction rules. This is schematically and exemplarily illustrated in FIG. 4.

Figure 4:
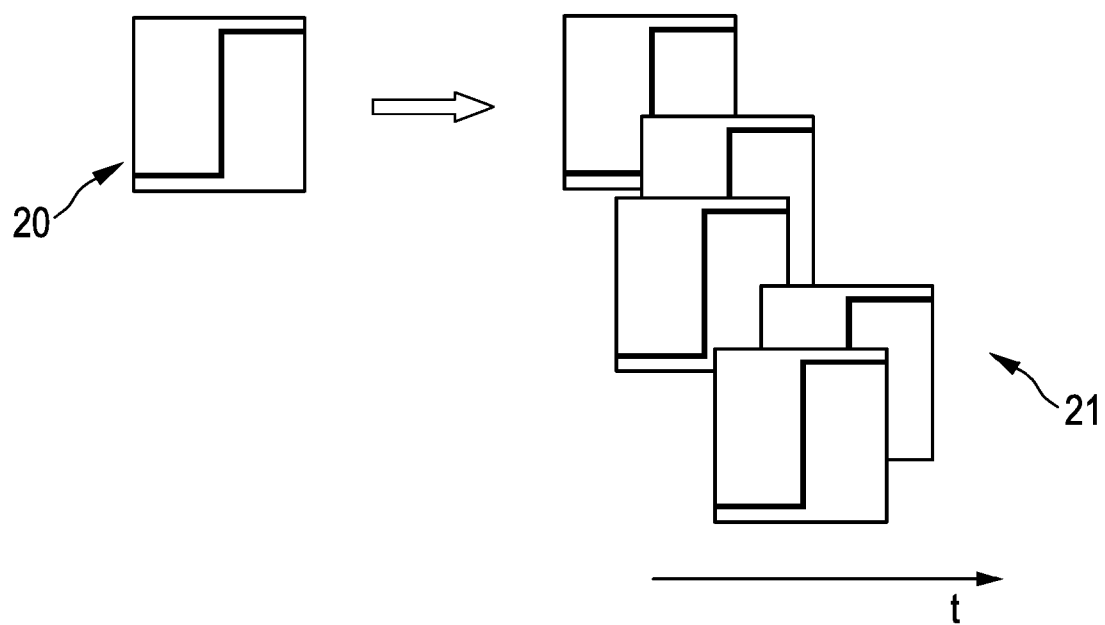
FIG. 4 illustrates schematically and exemplarily randomly delayed lighting commands.

In the example illustrated in FIG. 4 a PoE lighting command 20 has been received via the Ethernet cable 5, which indicates that all lighting units 30, 31, 32, 33 should be switched on. The PoE control unit 10 modifies this PoE lighting command 20 in accordance with the slope reduction rules such that several PoE lighting commands 21 are generated, which should be sent to the different lighting units 30, 31, 32, 33, wherein these PoE lighting commands 21 are randomly distributed in time t over a predefined maximum random delay time, i.e. over the predefined time interval, depending on the occupancy information. Thus, if the lighting units 30, 31, 32, 33 should be switched on, not the light intensity may get rammed, in order to soften the power consumption step, but the PoE lighting commands finally sent to the lighting units get randomly delayed. In this example the maximum random delay time determines how much the power change gets stretched over time.

The PoE control unit 10 is preferentially adapted to control the lighting units 30, 31, 32, 33 such that the slope of the overall power consumption of the lighting units 30, 31, 32, 33 will be larger, if the determined overall power change amount is smaller, and that the slope of the overall power consumption of the lighting units 30, 31, 32, 33 will be smaller, if the determined overall power change amount is larger. In particular, the PoE control unit 10 is adapted to distribute the power level setting times, at which the different lighting units 30, 31, 32, 33 are set to their desired power levels, depending on the occupancy information over a smaller predefined time interval, if the determined overall power change amount is smaller, and over a larger predefined time interval, if the determined overall power change amount is larger. Thus, a magnitude of the slope of the overall power change can be inversely related to a magnitude of the calculated overall power change. For instance, if the determined overall power change is smaller than 10 W, the slope of the overall power consumption of the lighting units 30, 31, 32, 33, when being set to the desired power levels, may not be modified. If the determined overall power change is between 10 W and 30 W, the power level setting times may be spread over 10 ms. If the determined overall power change is between 30 W and 70 W, the power level setting times may be spread over 30 ms. If the determined overall power change is between 70 to 100 W, the power level setting times may be spread over 50 ms. And, if the determined overall power change is larger than 100 W, the power level setting times may be spread over 100 ms. Thus, a corresponding table or calculation formula may be used, in order to make low softening for a low amount of controlled power and strong softening when the power level, i.e. the determined overall power change, is high.

The PoE control unit 10 is adapted to randomly control the lighting units 30, 31, 32, 33 such that a lighting unit assigned to an area having a higher degree of occupancy is set to its desired power level before setting a desired power level of a lighting unit assigned to an area having a smaller degree of occupancy. In particular, the control unit 10 is adapted to assign probabilities to the lighting units 30, 31, 32, 33 depending on the occupancy information, wherein the probability is the probability of earliness of setting the respective desired power level during the random control and wherein the PoE control unit 10 is adapted to randomly distribute the power level setting times, at which the respective lighting units 30, 31, 32, 33 are to be set to their respective power levels, depending on the assigned probabilities. The PoE control unit is adapted to assign a higher probability to a lighting unit assigned to an area having a larger degree of occupancy and to assign a lower probability to a lighting unit assigned to an area having a smaller degree of occupancy. Thus, the lighting units 30, 31, 32, 33 may not be set to the desired power levels in a regular order, which might be defined by, for instance, their locations or addresses, but in a random manner. This can lead to the effect that all occupied areas A, B, C, D are at least slightly illuminated at relatively short notice.

The slope reduction rules may further define the number of lighting units, which are allowed to be switched on at a same time, and define a waiting time before switching one or several further lighting units on. The PoE control unit 10 may be adapted to control the lighting units also under consideration of these definitions.

Figure 5:
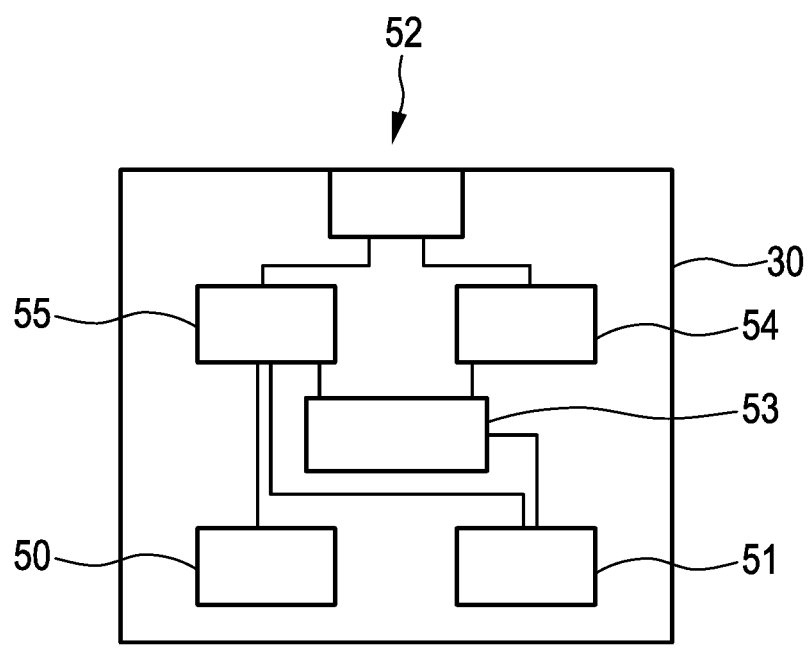
FIG. 5 shows schematically and exemplarily a lighting unit of the lighting system.

FIG. 5 shows schematically and exemplarily an embodiment of one of the lighting units. The lighting unit comprises a PoE connector 52 to which an Ethernet cable 3 is connectable. The lighting unit further comprises a PoE communication unit 54 for communicating with the control system 4 and a power distribution unit 55 for distributing the power received via the respective Ethernet cable 3 and the PoE connector 52 from the control system 4. The lighting unit further includes a light source 50, a presence detector 51 and a control unit 53 for controlling different components of the lighting unit. The control unit 53 is especially adapted to negotiate the power to be received by the lighting unit with the control system 4 and to control the power distribution unit 55 in accordance with the negotiated power. The presence detector 51 is adapted to detect a presence of a person within the respective area. For instance, if the lighting unit is one of the first lighting units 30 as exemplarily indicated in FIG. 5, the presence detector 51 is adapted to detect the presence of a person in the first room A. In this embodiment all lighting units 30, 31, 32, 33 may be constructed as schematically and exemplarily illustrated in FIG. 5.

Figure 6:
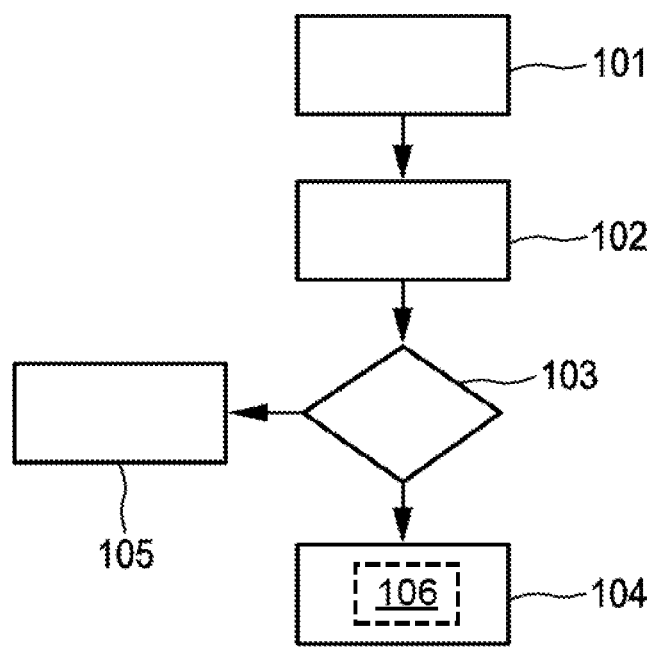
FIG. 6 shows a flowchart exemplarily illustrating an embodiment of a control method for controlling the lighting units of the lighting system.

In the following an embodiment of a control method for controlling lighting units of a lighting system will exemplarily be described with reference to a flowchart shown in FIG. 6.

In step 101 a PoE lighting command defining desired power levels of the lighting units are provided by a lighting command providing unit. For instance, a PoE lighting command is provided, which indicates that several or all lighting units should be switched on, thereby defining the respective power levels required by the lighting units when switched on. Moreover, in step 101 occupancy information being indicative of the degree of occupancy of areas, to which the lighting units are assigned, is provided by an occupancy information providing unit. In particular, the presence detectors of the lighting units detect whether a person is present in the respective area or not and this information is sent from the lighting units to the PoE communication unit of the control system as binary occupancy information, wherein this binary occupancy information is then provided by the PoE communication unit to the PoE control unit of the control system. In step 102 the overall power change amount, which will be caused by the provided PoE lighting command, is determined, i.e. estimated, based on the provided PoE lighting command by the PoE control unit. For instance, if several or all lighting units should be switched on, the power levels required by the lighting units to be switched on can be aggregated, in order to determine the overall power change amount. The PoE control unit can comprise a table containing information about the power levels required by the respective lighting units when switched on. In step 103 it is determined whether the determined overall power change amount is larger than a predefined power change threshold. If this is the case, in step 104 the lighting units are controlled depending on the occupancy information such that the slope of the overall power consumption of the lighting units, when being set to the desired power levels, is reduced, wherein the lighting units are set to their desired power levels at different times. For instance, in step 106, the corresponding power level setting times can be randomly distributed over a predefined time interval, which may be regarded as being a maximum delay time, wherein a lighting unit assigned to an occupied area is set to its desired power level before setting a desired power level of a lighting unit assigned to a non-occupied area. If the determined overall power change amount is not larger than the predefined power change threshold, in step 105 the lighting units are just controlled in accordance with the unmodified PoE lighting command provided in step 101. Thus, in step 105 the slope of the overall power consumption of the lighting units, when being set to the desired power levels, is not reduced.

An overall lighting control system, which may provide a lighting command to a control system like the PoE PSE 4 described above with reference to FIGS. 1 to 5, may control the lighting units of a complete building or even of an entire street or city. The overall lighting control system may issue lighting commands to a high number of lighting units. The overall lighting control system can be adapted to control the lighting units depending on daylight using light sensors, wherein external light levels can cause substantial changes in artificial light control levels, i.e. can generate substantial changes in power consumption of the lighting units. Also big spaces in warehouses or parking lots comprising lighting units for illuminating different areas can have related issues in rough supply power changes.

If a huge number of lighting units is commanded to synchronously change their power levels, this can result in substantial changes in power consumption occurring in a short period of time. This can cause stability problems in energy networks. Moreover, not only daylight or time of day steered lighting control systems may cause substantial changes in power consumption, but also errors in control programs may erroneously issue commands that cause oscillating input power. Furthermore, evil intruders may intentionally try to destroy equipment or try to get a system temporarily out of operation by issuing rapidly power changing commands, i.e. lighting commands causing lighting units to change their power consumption.

Figures 7, 8:
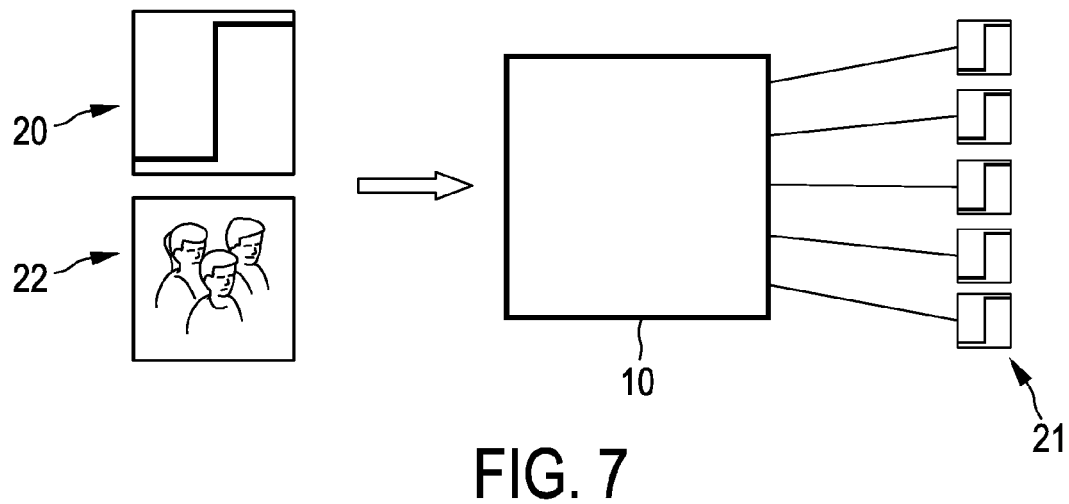
FIG. 7 illustrates schematically and exemplarily a control of lighting units depending on a lighting command and occupancy information.
FIG. 8 shows a table illustrating a generation of a switch-on sequence.

The control system and control method for controlling a lighting system comprising several lighting units assigned to different areas described above with reference to FIGS. 1 to 6 are therefore adapted to limit the maximal slope of power request by using occupancy information, wherein the occupancy information is used to limit visible effects. Preferentially, the execution of a lighting command is spread over time in a way that minimally influences the users of a space, in particular, persons which might be present in the different areas to which the lighting units are assigned. In particular, as schematically and exemplarily illustrated in FIG. 7 and as also described above, a provided lighting command 20 indicating that several lighting units should be switched on and occupancy information 22 indicating in which area persons are present can be used by the PoE control unit 10 for generating PoE lighting commands, i.e. IP commands, which are sent to the respective lighting units at different times, in order to ensure that at least some of the lighting units are switched on at different times. The switch-on times, which may also be regarded as being delay times, are preferentially randomly distributed such that lighting units assigned to occupied areas are switched on before switching on lighting units assigned to non-occupied areas. A possible sequence of switching on the lighting units is schematically and exemplarily illustrated in the table shown in FIG. 8.

In this table the column LA indicates an IP address of the respective lighting unit, the column LL indicates the location of the respective lighting unit, the column RN indicates a respective random number, the column OD indicates the occupancy information and the column OS indicates the respective switch-on sequence. In the column LS F1 indicates a first floor, F2 indicates a second floor and F3 indicates a third floor of a building. In the column OD Y indicates that the respective floor is occupied and N indicates that the respective floor is not occupied. In the example shown in the table random numbers have been assigned to the different lighting units, i.e. to the different IP addresses, such that lighting units assigned to an occupied area have a lower random number and lighting units assigned to a non-occupied area have a larger random number. The switch-on sequence is formed in accordance with the random numbers. In particular, since the first floor is occupied, the lighting units in the first floor receive lower random numbers and the lighting units in the other floors, which are not occupied, receive larger random numbers. The lighting units get activated from the lowest random number to the highest random number resulting in the sequence shown in the column OS.

The Ethernet cables are not only used for the power transport, but also to control the lighting units remotely via the IP protocol. The PoE lighting commands are IP commands, which may address a substantial number of lighting units, which may lead to a substantial power change, especially to a substantial current change. For instance, when before working hours a lighting control system of a building commands corridor light units on all floors in the building to be switched on, this may cause an inrush current at the PoE power supply side. Also when commands are erroneously distributed, which causes a high number of lighting units to blink, this may lead to problems such as blown fuses or damage to hardware. Also hacker attacks may target this issue.

The lighting system described above with reference to FIGS. 1 to 5 and the control method described above with reference to FIG. 6 are therefore preferentially adapted to mitigate issues in current peaking due to load commands, i.e. due to the PoE lighting commands. Potential issues in terms of inrush current and current spikes caused by the load control commands, i.e. by the PoE lighting commands, may be determined and, if the PoE lighting commands may have the potential to cause trouble, the command flow may be influenced, in order to reduce the current change rate and in this mitigate the problem. In particular, lighting commands for different lighting units preferentially get randomly delayed, in order to soften the power consumption, wherein a maximum random delay time may determine how much the power change gets stretched over time. The occupancy of spaces, i.e. the occupancy information, can be used to set the probability for a command, which should be sent to a respective lighting unit by the control system 4, getting out early. For instance, lighting units assigned to highly occupied rooms or corridors may get the respective control command with higher probability in the random delay generation than lighting units assigned to non-occupied areas.

In an embodiment a PoE lighting system may comprise lighting units assigned to different areas and occupancy sensors, i.e. presence detectors, which are bound to certain lighting units or groups of lighting units. After a power outage firstly the occupancy sensors may start to operate and the lighting units may all remain switched off. After some occupancy sensors indicate occupancy in one or several areas, the lighting units bound to these occupancy sensors may get reactivated with a relatively high priority, i.e. with a relatively low delay. Lighting units or groups of lighting units bound to occupancy sensors, which do not detect occupancy, receive a low reactivation priority, i.e. they are reactivated with longer delay times. Rules, for instance the slope reduction rules, may define how many lighting units are allowed to be switched on at one moment and how long it should be waited before switching on further lighting units. These rules may further define that the delay times are randomly distributed, wherein this random distribution is carried out such that firstly lighting units with a high reactivation priority are switched on and, after all lighting units with a high reactivation priority have been switched on, the lighting units with a lower reactivation priority get reactivated. The random process is preferentially used, in order to not allow the lighting units to be switched on in a regular order of, for instance, IP addresses or locations, but wildly, in order to provide a minimal illumination in all regions of the occupied areas on relatively short notice.

Figure 9:
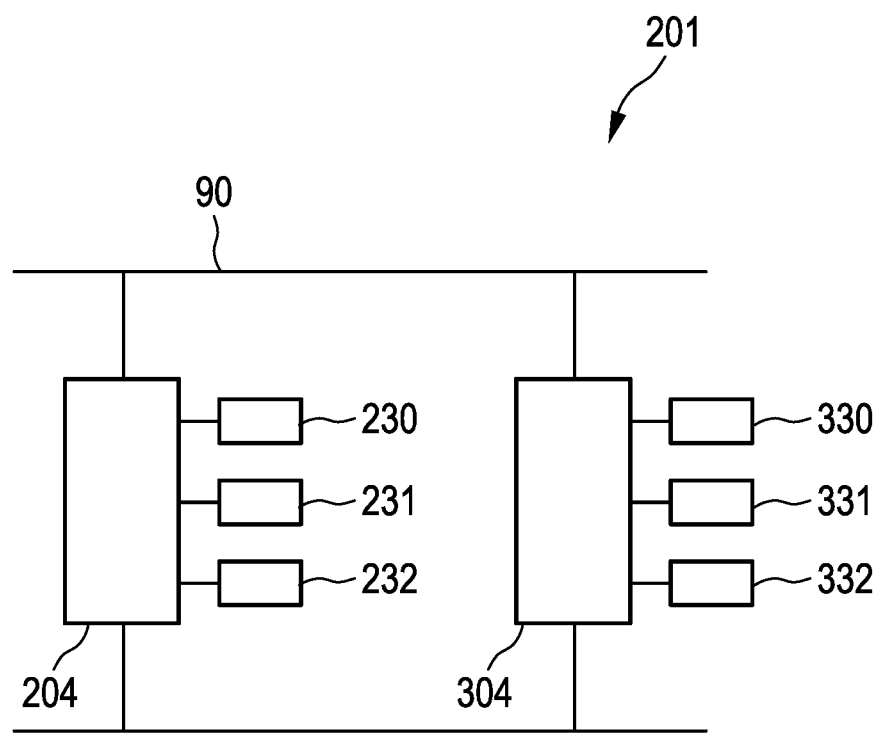
FIG. 9 shows schematically and exemplarily a further embodiment of a lighting system comprising several lighting units assigned to different areas.

FIG. 9 shows schematically and exemplarily a further embodiment of a lighting system 201 comprising several first lighting units 230, 231, 232 connected to a first control system 204 and several second lighting units 330, 331, 332 connected to a second control system 304. The control systems 204, 304 are PoE PSEs and comprise lighting command receiving units, which are adapted to receive PoE lighting commands via a data communication channel, which is not shown in FIG. 9 and which might be provided by Ethernet cables, from, for instance, a building management system and to provide the received lighting commands to control units of the PoE PSEs 204, 304. The lighting command receiving units can therefore also be regarded as being a lighting command providing units. The PoE PSEs 204, 304 receive supplied power via supply rails 90. The first lighting units 230, 231, 232 are assigned to different first areas of a building and the second lighting units 330, 331, 332 are assigned to different second areas of the building. Each lighting unit 230, 231, 232, 330, 331, 332 has an integrated presence detector, in order to detect a presence of a person in the respective assigned area. The information whether there is a person present in the respective area is sent to the respective PoE PSE 204, 304, where this occupancy information is received by a respective PoE communication unit. The respective PoE communication unit provides the received occupancy information to the respective control unit and can therefore also be regarded as being an occupancy information providing unit.

The control unit of the first PoE PSE 204 is adapted to control the first lighting units 230, 231, 232 in accordance with the respective lighting commands and depending on the respective occupancy information such that the different first lighting units 230, 231, 232 are set to the desired power levels at different times. And, the control unit of the second PoE PSE 304 is adapted to control the second lighting units 330, 331, 332 in accordance with the respective lighting commands and depending on the respective occupancy information such that the different second lighting units 330, 331, 332 are set to the desired power levels at different times. The PoE PSEs 204, 304 may be similar to the PoE PSE 4 described above with reference to FIGS. 1 and 3. Moreover, the lighting units 230, 231, 232, 330, 331, 332 may be similar to the lighting units described above with reference to FIGS. 1 and 5.

Figure 10:
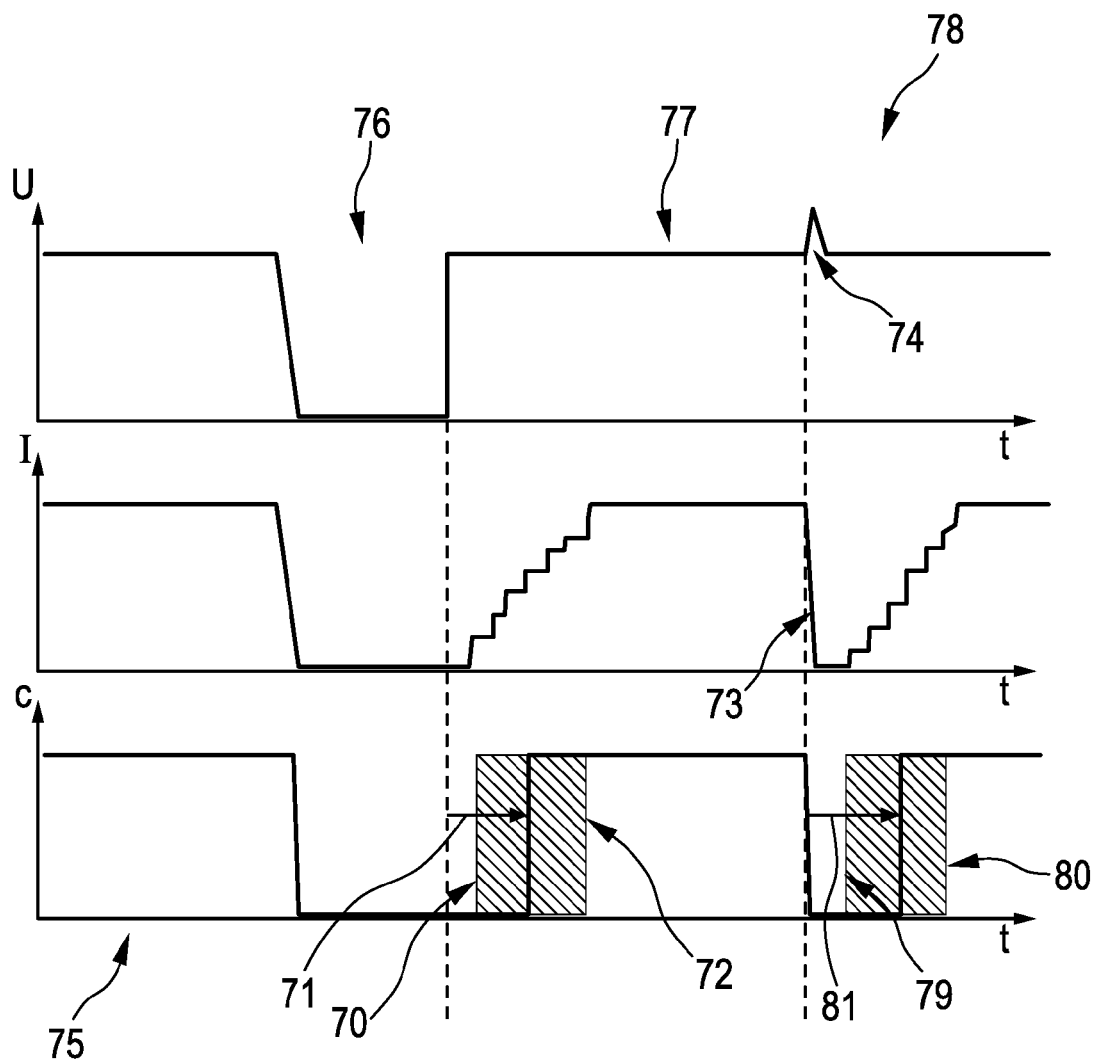
FIG. 10 illustrates schematically and exemplarily a reduction of a current change rate caused by the control method.

The smoothed current change rate caused by controlling the lighting units in accordance with the respective lighting command and depending on the occupancy information such that different lighting units are set to their desired power level at different times is schematically and exemplarily illustrated in FIG. 10.

FIG. 10 shows the supply voltage U provided by the supply rail 90, the supply current I supplied by the supply rail 90, and lighting unit control signals C depending on the time t. In a first situation indicated by the arrow 75 a maximal supply voltage U and a maximal supply current I are provided and the control signal C indicates that all lighting units are switched on. In a further situation indicated by the arrow 76 the supply voltage U and the supply current I are zero and the lighting units are switched off. In a situation indicated by reference number 77 the lighting units are switched on again, wherein the lighting units are not all switched on at the same time, but with different delay times, wherein reference number 70 indicates an earliest switch-on time and reference number 72 indicates a latest switch-on time. The arrow 71 indicates an average delay time. Because of the different switch-on times, the supply current I increases relatively smoothly. In a situation indicated by reference number 78 a spike 74 has been detected, which causes a restart of the lighting system. The spike 74 may be caused by switching actions of other devices like other PoE PSEs connected to the supply rail 90 and it may be detected by a corresponding measurement device of the respective PoE PSE 204, 304, which may detect, for instance, the current cut 73. During the restart the lighting units are again switched on at different times, wherein reference number 79 indicates the earliest switch-on time and reference number 80 indicates the latest switch-on time. The average delay time is indicated by the arrow 81.

Thus, FIG. 10 schematically and exemplarily shows how the delay gets inserted after power is coming back on, for instance, a supply rail. The dashed areas show how the different delay times can spread the load-on control to reduce the current change rate. The lighting units may not only be switched off due to a power outage, but also due to, for instance, spurious glitches on, for instance, a supply rail as indicated by the spike 74 in FIG. 10. The PoE PSE can be adapted to monitor the power drain on all connected lighting units, in order to detect that many lighting units went off in a single moment. The PoE PSE can further be adapted to also detect that this occurred without any sent control command. The PoE PSE can therefore know that these luminaires will need to be activated again and can randomize that in order to reduce the related current change rate.

The PoE PSE can be adapted to randomize the negotiation sequence for the different PoE connectors, i.e. for the different ports, in order to ensure that the lighting units get active one after the other, wherein the randomized negotiation sequence is influenced by the occupancy information.

The control unit of the control system for controlling the lighting units of the lighting system may be adapted to use an algorithm aggregating the number of addressed, i.e. targeted, lighting units and the related change in power consumption. The control unit is preferentially further adapted to use the delay mechanism only when required, because a general smoothing of the commands might change the intended lighting behavior too much in a situation where, for instance, power instability is not a problem. For instance, the smoothing process can be omitted, when the power change is below a given threshold. The control unit is preferentially further adapted to generate a low softening for a low amount of controlled power and a strong softening when the power level is high.

Delaying thousands of switch-on times of lighting units in a random manner can lead to a situation, in which it takes some seconds before all desired lighting units are switched on. Thus, dark spots may be present for, for instance, several seconds in crucial/important areas like staircases or walking paths to exits. The control unit of the control system for controlling the lighting units of the lighting system can therefore be adapted to control the lighting units in accordance with the respective lighting command not only depending on the occupancy information, but additionally also on, for instance, the location of the respective lighting unit, the type of the respective lighting unit or a history in motion detection, such that different lighting units are set to their desired power levels at different times. For instance, a weight factor can be used, which influences the switch-on sequence and which can depend on the location of the respective lighting unit, the type of the respective lighting unit and the history in motion detection. For example, if random numbers are assigned to the different lighting units, a respective weight factor can be added or subtracted from the respective random number, in order to influence the finally resulting switch-on sequence. In an embodiment the control unit may also be adapted to apply the occupancy based control not to all lighting units, i.e. to lighting units in critical areas like staircases or walking paths to exits the occupancy based control may not be applied, in order to illuminate the critical areas, even if there is no person within the respective critical area and/or even if an occupancy sensor for sensing the respective critical area is defect and does not work. The history in motion is preferentially a history in walking area during a starting period or an ending period of working time. For instance, the control unit can be adapted to store at which times which areas are occupied during a day and to determine based on this occupancy history information, which may be regarded as a history in motion information or a history in walking area information, how likely a certain area will become occupied after it has been detected that another area is occupied. The control unit can be adapted to use known statistical methods for determining these likelihoods. For instance, if the occupancy history information shows that, after in a restroom occupancy has been detected, always or almost always occupancy is detected in the corridor next to the restroom, the control unit can determine that the likelihood of detecting occupancy in the corridor after having detected occupancy in the restroom is very high. The control unit can be adapted to treat an occupied area and an unoccupied area, which has a high likelihood, i.e., for instance, a likelihood being larger than a predefined threshold, of becoming occupied, with the same priority while controlling the lighting units depending on the occupancy information such that, for instance, the occupied area and the unoccupied get illuminated in the same way. This may ensure, for instance, in the above mentioned example that the corridor next to the restroom is illuminated, even if not occupied, when the restroom is occupied. Generally, it can be assumed that neighboring areas, which are connected by, for instance, doors, will have a large likelihood that, after a certain area has become occupied, also a direct neighboring area will become occupied. Controlling the lighting units depending on these likelihoods can therefore lead to the effect that a person leaving a first area will immediately have light in a neighboring second area.

It may not give a professional experience, if here and there lighting units are randomly switched on. The control unit of the control system for controlling the lighting units of the lighting system can therefore be adapted to control the lighting units per group. For instance, with reference to FIG. 2, the first lighting units 30 may form a first group, the second lighting units 31 may form a second group, the third lighting units 32 may form a third group and the fourth lighting units 33 may form a fourth group, wherein different lighting units of a same group are set to their desired power levels at the same time. In a further embodiment, the control may be implemented per floor or, more generally, all lighting units which can be simultaneously within a visual sight of a person may be grouped like the lighting units on multiple floors at a staircase.

In an embodiment the control unit may be adapted to control the lighting units such that they are set to a predefined first power level before being controlled in accordance with the lighting command and depending on the occupancy information such that the different lighting units are set to their desired power levels at different times. For instance, in an embodiment firstly each lighting unit addressed by a current lighting command may be switched to a maximum dim level such that the total power consumption is still quite low, wherein then a random delay, which depends on the occupancy information, may be applied, in order to ramp up the lighting units towards the respective desired powered levels.

The PoE lighting system is a direct current (DC) power distribution system. In comparison to alternating current (AC) systems the DC power distribution systems allow for simplifications of load power components, energy saving by reduction of distribution and conversion losses as well as simplified integration of local green energy sources. But, DC power distribution systems often suffer from inrush—the effect of increased current consumption on device power on. Unlike done in AC systems, a DC load can beneficially have a capacitor at the power input terminals. Such a capacitor prevents that the current ripple of the load itself propagates fully to the power grid and smoothes spikes, especially short overvoltage pulses, in order to protect the load. But, such input capacitors would produce excessive currents whenever the grid needs to be powered up as all capacitances need to be charged at once. A specific source for inrush are, for instance, lighting units based on halogen incandescent lamps, as the filament needs a multiple of nominal current until the lamp gets on temperature. Disadvantages of inrush can be, for instance, temporary power and equipment unavailability on startup, due to exceeded current limit, and user-noticeable power on/off effects caused by inrush and protection, like lights flashing, and systems failing to switch on after power drop.

Although in above described embodiments the control system and the lighting system are PoE systems, in other embodiments these systems can also be systems of another kind like systems in accordance with the EMerge Alliance standard. The EMerge Alliance has defined specific requirements and standards for limiting the available power per bus bar which is a strip made of, for instance, copper or aluminum that conducts electricity within a switchboard, distribution board, substation or other electrical apparatus. For example, the EMerge Alliance specification requires for low-voltage (24V) DC installations conformance with NFPA® National Electric Code safety regulations, thus limiting the available power to 100 VA per bus bar. In DC systems, inrush causes temporal exceeding of the allowable power budget on the bus bar, and thus temporal disconnection of the bus bar and unpowering of the devices supplied by it, an effect very disturbing to the user, especially if happening repeatedly, as likely on system startup. Inrush protection via electronic circuitry in the load may be costly.

In lighting control systems, especially in the professional lighting segment, lighting units can be assigned to groups. For example, all lighting units in one room may all be automatically controlled by a presence detector, or lighting units in one room may be assigned to different groups, controlled by light sensors (for instance for daylight integration at the window-side/corridor-side office lighting), or multiple workplace- or task-assigned buttons. In another example, enabling a hotel room before guest's arrival may require turning on of HVAC (Heating, Ventilation and Air Conditioning), default lighting and television for basic guest information or the like. In yet another example, powering a workplace may require turning on a desktop, a screen, a printer, loudspeakers and a smart phone docking station.

Although in above described embodiments lighting units are assigned to areas within a building like rooms and corridors, in other embodiments lighting units may also be assigned to areas outside of a building, wherein the occupancy information may be indicative of, for instance, whether a vehicle or pedestrian is present in the respective area.

Although in the embodiment described above with reference to FIGS. 1 to 5 the mechanism for delaying the power level setting times is substantially implemented in the control unit 10 of the control system 4 for controlling the lighting units of the lighting system, in other embodiments the mechanism can be implemented in another way.

The mechanism of providing the lighting command, of providing the occupancy information and of controlling the lighting units in accordance with the lighting command and depending on the occupancy information such that different lighting units are set to their desired power levels at different times can be implemented in the firmware of a PoE PSE, especially in a PoE PSE switch.

Although in the embodiment described above with reference to FIGS. 1 to 5, the presence detectors, i.e. the occupancy sensors, are integrated in the lighting units, in other embodiments the presence detectors may also be separate units, which are assigned to the respective areas and/or bound to respective lighting units.

The control unit of the control system for controlling the lighting units of the lighting system may be able to collect information which lighting unit and which presence detector are related by means of data collection during normal operation, where occupancy signals consistently lead to control messages towards a number of lighting units. Thus, the control unit can observe which occupancy signals lead to control messages to which lighting units, wherein the control unit can bind the lighting units and the presence detectors to each other based on this information.

In the embodiment described above with reference to FIGS. 1 to 5 the control unit of the control system for controlling the lighting units of the lighting system comprising the several lighting units assigned to the different areas is a PoE PSE. The PoE PSE may have an own mains circuit, wherein it may be adapted to reduce the inrush within the scope of the PoE PSE, i.e. the mechanism for reducing the inrush may be implemented on the PoE PSE level, wherein a mechanism for reducing the inrush of a larger amount of lighting units may not be necessary. However, it is also possible that the control system for controlling the lighting units of the lighting system is a control system controlling a larger amount of lighting units. For instance, the control system can be a building management system, which might not only control lighting units in an occupancy centric way, but also other loads like air conditioning equipment, computers, displays, et cetera. Thus, a building management system may be provided, which is adapted to control lighting units in accordance with a provided lighting command and depending on provided occupancy information such that different lighting units are set to their desired power levels at different times. The control mechanism can therefore be applied in a more central way by using, for instance, the building management system, which might have access to all presence sensors, which may be motion sensors, in a building and which might be able to control each individual lighting unit in the building based on the occupancy information, or the control mechanism may be applied in a more distributed way by using, for instance, an area controller, which might be implemented in the firmware of a PoE PSE and which has access to all presence sensors in the respective area and which controls the lighting units in the respective area based on occupancy information received from the presence sensors.

In an embodiment the control system for controlling the lighting units of the lighting system may be adapted to allow for disabling and enabling the control depending on the occupancy information such that different lighting units are set to their desired power levels at different times. For instance, by default the occupancy control may be enabled, but it may be adapted to allow, for instance, a central server to disable the occupancy control.

If the commands defining the desired power levels of the lighting units are distributed over a network, i.e., for instance, if they are IP commands, the occupancy-based control may be disabled or enabled based on the speed of the network. If the speed of the network is lower than a predefined threshold, the occupancy-based control may be enabled. Moreover, the occupancy-based control may be enabled or disabled depending on the number of switch-on requests within the network. In particular, if the number of switch-on requests is lower than a predefined threshold, the occupancy-based control may be disabled. For instance, a node of the network may allow the occupancy-based control to be switched off, if there are hardly switch-on requests in the network.

Although in above described embodiments the occupancy-based control is used only under certain conditions, in other embodiments the occupancy-based control may always be used, if the lighting system is active.

Although in above described embodiments the control system and method are used for controlling a lighting system comprising several lighting units assigned to different areas, in other embodiments also other loads, which are assigned to different areas, can be controlled in accordance with provided commands and depending on occupancy information such different loads are set to their desired power levels at different times.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the overall power change, the control of the lighting units, et cetera performed by one or several units or devices can be performed by any other number of units or devices. For example, steps 102 to 105 can be performed by a single unit or by any other number of different units. These procedures and/or the control of the control system in accordance with the control method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a control system for controlling lighting units of a lighting system, wherein the lighting units are assigned to different areas and the control system is adapted to control the lighting units in accordance with a lighting command, which defines desired power levels, and depending on occupancy information, which is indicative of a degree of occupancy of the areas, such that different lighting units are set to their desired power levels at different times, even if the provided lighting command requests to set the lighting units to their respective desired power levels at substantially the same time. This can reduce the likelihood of, for instance, blown fuses or damaged components of the lighting system, while, because of the consideration of the occupancy information, the delay in setting the lighting units to their desired power levels may be not or only hardly visible.

The invention claimed is:

1. A control system for controlling a plurality of lighting units of a lighting system, wherein the plurality of lighting units are assigned to different areas and the control system comprises:

a lighting command providing unit for providing a lighting command defining desired power levels of the plurality of lighting units of the lighting system;

an occupancy information providing unit for providing occupancy information being indicative of a degree of occupancy of the different areas; and a control unit for controlling the plurality of lighting units, wherein the control unit is adapted to control the plurality of lighting units in accordance with the lighting command and depending on the occupancy information such that different lighting units of the plurality of lighting units are each respectively set to the respective desired power level, defined for the respective lighting unit of the different lighting units by the provided lighting command, at different times, wherein the control unit is further adapted to control the plurality of lighting units such that a given lighting unit, of the plurality of lighting units, assigned to an area having a given degree of occupancy is set to the desired power level defined for the given lighting unit before setting the desired power level defined for a lighting unit, of the plurality of lighting units, that is assigned to an area having a degree of occupancy which is smaller than the given degree of occupancy, and wherein the control unit is adapted to randomly control at which times the respective lighting units of the plurality of lighting units are set to their respective desired power levels, wherein the random control depends on the occupancy information, and wherein the control unit is adapted to assign a respective probability to each lighting unit of the plurality of lighting units depending on the occupancy information, wherein each respective probability is a probability of earliness of setting the respective desired power level, defined for the lighting unit to which the respective probability is assigned, during the random control and wherein the control unit is adapted to randomly distribute power level setting times, at which the respective lighting units of the plurality of lighting units are to be set to the respective power levels defined for the respective lighting units, depending on the assigned probabilities.

2. The control system as defined in claim 1, wherein the respective probability assigned to the given lighting unit is higher than the respective probability assigned to the lighting unit, assigned to said area having the degree of occupancy which is smaller than the given degree of occupancy.

3. The control system as defined in claim 1, wherein the control unit is adapted to randomly distribute power level setting times, at which the respective lighting units of the plurality of lighting units are to be set to their respective power levels, over a predefined time interval and to control the plurality of lighting units in accordance with the randomly distributed power level setting times.

4. The control system as defined in claim 1, wherein the control unit is adapted to determine an overall power change, which will be caused when the desired power levels as defined by the lighting command are set, to compare the determined overall power change with a predefined power change threshold and to control power levels of the plurality of lighting units in accordance with the lighting command and depending on the occupancy information such that the different lighting units of the plurality of lighting units are each respectively set to the respective desired power level, defined for the respective lighting unit of the different lighting units by the provided lighting command, at the different times, only if the determined overall power change is larger than the predefined power change threshold.

5. The control system as defined in claim 1, wherein the control unit is adapted to calculate an overall power change, which will be caused when the desired power levels as defined by the lighting command are set, and to respectively set each of the different lighting units of the plurality of lighting units to the respective desired power level, defined for the respective lighting unit of the different lighting units by the provided lighting command, at the different times such that a magnitude of a slope of an overall power change, actually caused by the setting of the different lighting units at the different times, is inversely related to a magnitude of the calculated overall power change.

6. The control system as defined in claim 1, wherein the plurality of lighting units are grouped, wherein the control unit is adapted to control the plurality of lighting units per group.

7. The control system as defined in claim 1, wherein the control unit is adapted to control the plurality of lighting units such that the plurality of lighting units are set to a predefined first power level before being controlled in accordance with the lighting command.

8. The control system as defined in claim 1, wherein the control system is a Power over Ethernet (PoE) control system for controlling a PoE lighting system.

9. The lighting system as defined in claim 1, wherein the lighting system comprises the plurality of lighting units and the control system as defined in claim 1.

10. A control method for controlling a plurality of lighting units of a lighting system, wherein the plurality of lighting units are assigned to different areas, and the control method comprises:
providing a lighting command defining desired power levels of the plurality of lighting units of the lighting system by a lighting command providing unit;
providing occupancy information being indicative of a degree of occupancy of the different areas by an occupancy information providing unit; and
controlling the plurality of lighting units by a control unit in accordance with the lighting command and depending on the occupancy information such that different lighting units of the plurality of lighting units are set to the desired power levels, which are defined by the provided lighting command for the different lighting units, at different times; and
wherein the control unit is adapted to assign a respective probability to each lighting unit of the plurality of lighting units depending on the occupancy information, wherein each respective probability is a probability of earliness of setting the respective desired power level, defined for the lighting unit to which the respective probability is assigned, and wherein the control unit is adapted to randomly distribute power level setting times, at which respective lighting units of the plurality of lighting units are to be set to the respective power levels defined for the respective lighting units, depending on the assigned probabilities.

11. A non-transitory computer readable medium comprising a computer program of instructions that, when executed by a processor, cause the processor to perform the control method of claim 10.

12. A control system for controlling a plurality of lighting units of a lighting system, wherein the plurality of lighting units are assigned to different areas and the control system comprises:
a lighting command providing unit for providing a lighting command defining desired power levels of the plurality of lighting units of the lighting system;
an occupancy information providing unit for providing occupancy information being indicative of a degree of occupancy of the different areas; and
a control unit for controlling the plurality of lighting units, wherein the control unit is adapted to control the plurality of lighting units in accordance with the lighting command and depending on the occupancy information such that different lighting units of the plurality of lighting units are each respectively set to the desired power level, defined for the respective lighting unit of the different lighting units by the provided lighting command, at different times, and wherein the control unit is adapted to assign a respective probability to each lighting unit of the plurality of lighting units depending on the occupancy information, wherein each respective probability is a probability of earliness of setting the respective desired power level, defined for the lighting unit to which the respective probability is assigned, and wherein the control unit is adapted to randomly distribute power level setting times, at which respective lighting units of the plurality of lighting units are to be set to the respective power levels defined for the respective lighting units, depending on the assigned probabilities.

* * * * *